United States Patent

Goss

Patent Number: 5,396,591
Date of Patent: Mar. 7, 1995

[54] TELEPHONE OPERATOR KEYING ARRANGEMENT

[75] Inventor: Stephen C. Goss, Wheaton, Ill.

[73] Assignee: AT&T Corp., Murray Hill, N.J.

[21] Appl. No.: 281,870

[22] Filed: Jul. 28, 1994

Related U.S. Application Data

[63] Continuation of Ser. No. 113,583, Aug. 27, 1993, abandoned, which is a continuation of Ser. No. 629,890, Dec. 19, 1990, abandoned.

[51] Int. Cl.[6] .......................... G06F 3/00; H04M 3/60
[52] U.S. Cl. .................................... 395/161; 395/155; 379/267; 379/223; 345/172
[58] Field of Search ............... 395/161, 155, 149, 156; 379/223, 267, 165, 105; 345/172, 178

[56] References Cited

U.S. PATENT DOCUMENTS

| | | | |
|---|---|---|---|
| 4,481,603 | 11/1984 | McCaskill et al. | 395/149 |
| 4,484,304 | 11/1984 | Anderson et al. | 395/161 |
| 4,646,250 | 2/1987 | Childress | 395/149 |
| 4,698,618 | 10/1987 | Liuzzo et al. | 340/365 R |
| 4,763,356 | 8/1988 | Day, Jr. et al. | 395/155 X |
| 5,008,210 | 4/1991 | Kessel et al. | 395/149 |
| 5,046,087 | 9/1991 | Sakai | 379/267 X |
| 5,117,372 | 5/1992 | Petty | 395/161 |
| 5,157,718 | 10/1992 | Kaplan et al. | 379/223 X |
| 5,255,363 | 10/1993 | Seyler | 395/149 X |
| 5,287,514 | 2/1994 | Gram | 395/155 X |

OTHER PUBLICATIONS

"Terminal", Microsoft Windows Version 2.0 Desktop Applications User's Guide, 1987, pp. 75–88, 96.

Primary Examiner—Raymond J. Bayerl
Attorney, Agent, or Firm—Werner Ulrich; David L. Hurewitz

[57] ABSTRACT

A method and apparatus for entering operator supplied information into a telephone operator assistance system. An operator interfaces with the system via an operator position having a terminal that includes a keyboard and a video display monitor. The operator operates a macro key, which is equivalent to operating a predefined string of keystrokes. The operator then keys data specific to a particular call, which data is interpolated into a predefined position within the string.

8 Claims, 4 Drawing Sheets

TELEPHONE OPERATOR KEYING ARRANGEMENT

This application is a continuation of application Ser. No. 08/113,583, filed on Aug. 27, 1993, now abandoned, which is a continuation application Ser. No. 07/629,890, filed on Dec. 19, 1990, now abandoned.

TECHNICAL FIELD

This invention relates to an improved method and apparatus for entering information into a system.

1. Problem

In modem telecommunications systems, operators are connected to an operator assistance switch by an operator position. The operator position includes a terminal with a keyboard for entering data and a cathode ray tube (CRT) display. Most of the work performed by an operator is accomplished by keying data derived by the operator. In a modem operator assistance system such as the operator services position system associated with the 5ESS ® switch manufactured by AT&T Network Systems, an operator is prompted to enter data and/or functions, referred to hereinafter simply as data, via a keyboard in response to information displayed on the screen of the operator position and information received orally from a calling or called customer of an operator assistance call. For example, if the operator is to enter a calling card number, the operator will do so in response to a highlighted display on the screen requesting a calling card number and a cursor which is moved as the calling card information is entered.

Keyboards for modem operator assistance systems frequently include macro keys whose operation is equivalent to the operation of a prespecified string of keys. However, even with the availability of macro keys, the present keying arrangements require a separate macro key for each unique macro sequence, even if the sequences vary by as little as one key. A problem with the prior art therefore is that realistic implementations provide too few macro keys for applications that could make use of a large number of similarly preprogrammed sequences, leaving operators to key those sequences manually, wasting valuable work time.

2. Solution

The above problem is solved and an advance is made over the prior art in accordance with the principles of my invention wherein an operator may press a single key, a macro key, which, in a departure from the prior art, represents an incomplete keying sequence in order to allow an operator to enter the data of a specific call as part of that sequence. The macro key specifies everything in the sequence except the data that is provided by the operator. Effectively, the macro key represents a series of initial keystrokes, a signal to a macrointerpreter to wait for operator input, and a series of terminal keystrokes; the operator supplies the keystrokes associated with the data of the specific call in the middle. In a preferred embodiment of the invention, the operator waits until the screen display requests the specific data and then enters the data. (Practically, the control of the display is so fast that the operator is almost immediately able to enter the data for the call). In alternative modes of operation, the macrointerpreter will interpolate the entered data in the proper position within the sequence of preliminary and post data entry keystrokes. The operator indicates the end of the series of data keystrokes by pressing a resume key as a signal to the macrointerpreter that the suffix keys may now be processed. Advantageously, this arrangement reduces work time, operator fatigue, and errors, and speeds up call processing. In addition, it requires fewer macro keys to program similar sequences, as illustrated infra.

In accordance with one aspect of the invention, an operator is able to operate a cancel key. As a result of operating the cancel key, any remaining unexecuted part of the macro sequence is canceled. For the case of operator entered information, if the cancel key is pressed before the operator information sequence is completed, this will give the system an indication that the macro is to be canceled before the balance of the macro is executed.

In accordance with another aspect of the invention, a macro is programmed to demand the operation of a confirm key prior to execution of the macro sequence. A confirm key might be used, for example, in conjunction with the macro sequence used to initiate a charge to the called customer for a collect call. By requiring the operator to press a confirm key, it is possible to warn the operator of the consequence of executing the collect call macro so that if the operator has made a mistake the operator can undo this request. The macrointerpreter is informed by the macro definition arrangement that a confirm key must be pressed before the macro is executed.

In accordance with another aspect of the invention, if a macro that is being executed specifies actions that are interpreted as error actions by the operator assistance switch, the balance of the macro sequence is canceled and the operator is notified of the identity of the step that caused the operator assistance switch to recognize that the macro function was operated erroneously. The macrointerpreter simply stops processing additional functions specified by the macro but does not undo those functions which have already been processed.

Not all operator keys can be operated at all times. For example, the position release key, which causes an operator position to be disconnected from a call, is blocked and may not be operated during the processing of a collect call until the called customer billing status has been validated. If a macro sequence includes the operation of a key which is blocked, then the macrointerpreter will stop executing the commands of the sequence implied by the macro key and will wait for a predetermined interval and try again to execute the command specified by the blocked key. If the second trial is also unsuccessful then execution of the macro sequence is terminated and the operator is informed of the situation.

DETAILED DESCRIPTION

Figure 1:
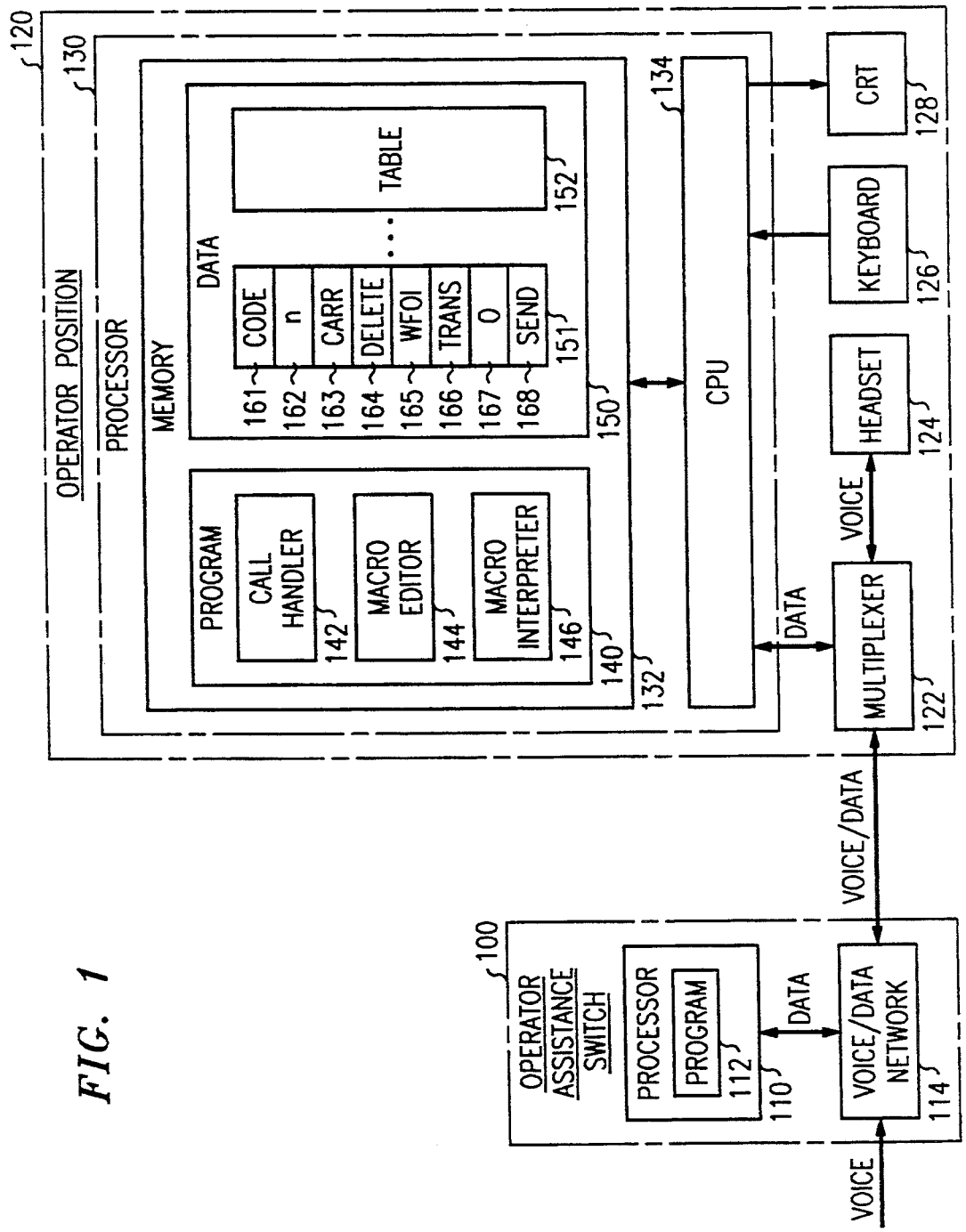
FIG. 1 is a block diagram of an exemplary embodiment of the invention including a program controlled operator position.

FIG. 1 is a block diagram of an operator assistance switch and an operator position connected thereto. The operator assistance switch is a 5ESS switch arranged to communicate with operator positions and including a combined voice/data network 114 for switching a combined voice/data signal to an operator position 120. The combined operation of the operator assistance switch and the operator position is essentially as described in J. Collins et al., U.S. Pat. No. 4,656,624. The operator position includes a processor 130 whose memory 132 contains a program 140 and data 150. The processor operates under the control of the program to generate and use data as described hereinafter for the purpose of implementing applicant's invention. The combined voice/data signal is connected to a multiplexer 122 which separates the voice signal and transmits that signal via an analog/digital converter to an operator and headset so that the operator can hear voice signals from the calling or called customers and can generate voice signals to be heard by these customers. The data signal from multiplexer 122 goes to processor 130 to be processed and processor 130 transmits data which is communicated to processor 110 of the operator assistance switch. The program 140 includes a call handler program for controlling displays on the CRT 128 and for accepting input from keyboard 126 and multiplexer 122. The specialized programs for implementing the features of applicant's invention are the macro editor 144 and the macrointerpreter 146. The macro editor 144 is used during the macro creation phase to generate a table, such as table 151, for defining the macro. The macrointerpreter 146, in response to the detection of the operation of a macro key on keyboard 126, then uses the contents of a table such as table 151, . . . , 152 to perform essentially the same actions that would be performed if an operator consecutively keyed all the items in, or called for by, the macro definition table.

An example of a macro that can be used in accordance with the principles of this invention is a macro to transfer a call to a selected common carrier. This situation is encountered when a caller dials 0, thus being connected to a local operator, but wishes to be connected to a toll operator of a common carder selected verbally to the local operator. Because the number of macro keys which can be accommodated on an operator keyboard is limited, it is desirable to use just one macro key to initiate a transfer to any common carder. For example, in the prior art, to transfer a caller to AT&T (identified by code 288), an operator would key a billing code (a field key plus one or more additional keys), a carder code (another field key plus the carder code—288 in this case), and the transfer directive (at least one more key); to transfer a caller to some other carder (identified by code xxx), the operator would key in a similar sequence but substitute xxx for 288. Even if a single macro key were used to specify all key operations preceding the operator entered code, and a second macro key were used to specify all key operations following the operator entered code, two macro key operations would be required of the operator. Using the principles of this invention, the operator can press a macro key preprogrammed to 1) automatically key the billing code and the field key associated with the carder, 2) wait for the operator to enter the desired carder code, and then 3) automatically key the transfer directive. Thus, one macro key would be enough to initiate the transfer of a caller to any carder.

Figure 2:
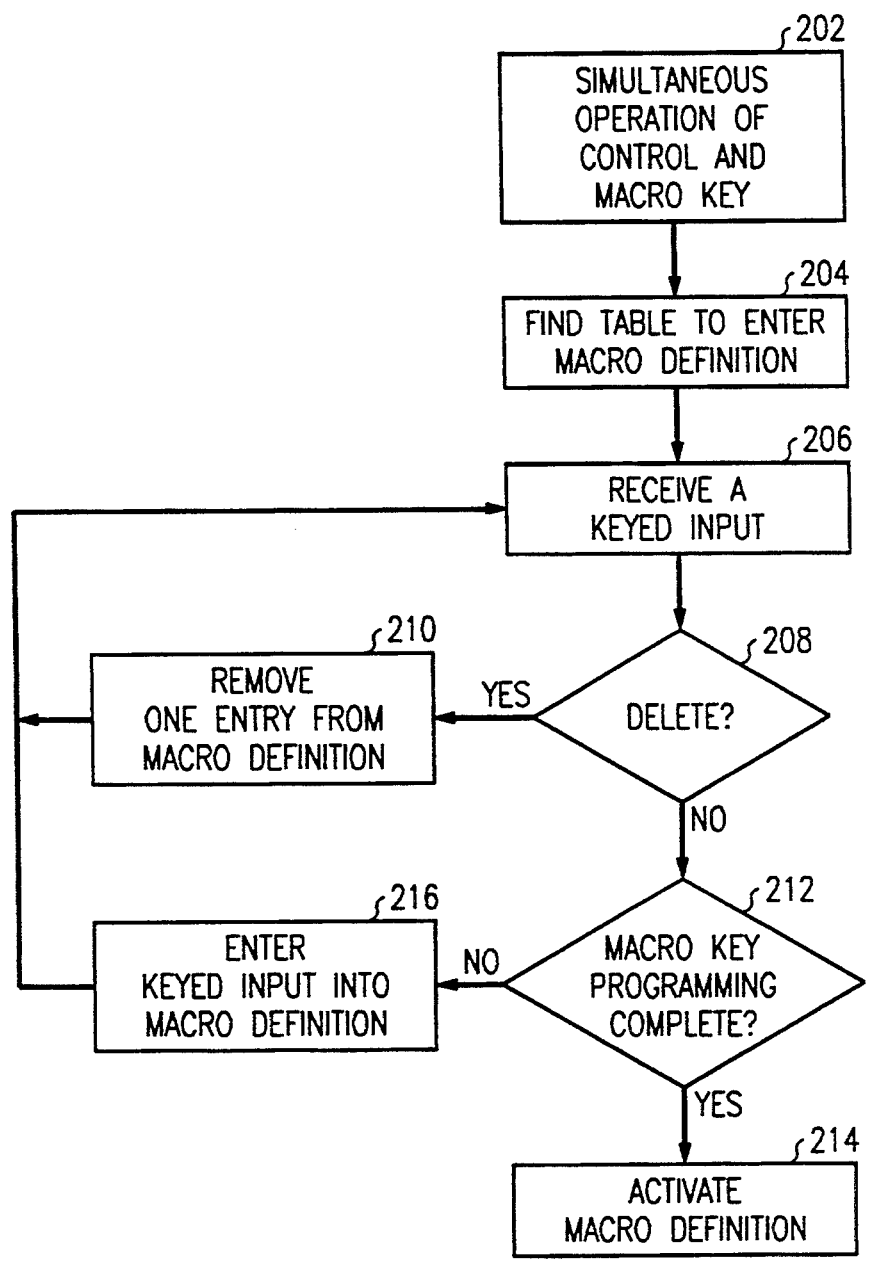
FIG. 2 is a flow diagram of a program for defining a macro key sequence.

In order to program a macro an operator simultaneously presses the control key and the desired macro key. The macro editor program shown in FIG. 2 is then called when these keys are pressed simultaneously (action block 202). The macro editor program finds a table such as table 151 to enter the macro definition (action block 204), and the address of table 151 is entered into a macro key interpretation table (not shown) so that when the macro key is pressed table 151 can be found via the interpretation table. Thereafter, whenever a keyed input is received (action block 206), test 208 determines whether the keyed input specifies a deletion. If so, one entry is removed from the macro definition and the macro editor awaits the next keyed input. If the input is not delete, test 212 checks whether the keyed input signals a completion of the macro key programming. (One input signal that could be used to indicate such completion is the "enter" key; in that case, a special combination of keys such as control/enter is used to define the enter key as part of a macro definition.) If the programming is complete, then the macro definition is activated 214. If an operator subsequently presses the same macro key whose operation initiated the macro definition in block 202, then the macro defined in the table will be executed. If the programming of the macro key is not complete, then the keyed input is entered into the macro definition (action block 216) and the system awaits the next keyed input. The loop involving repeated execution of action blocks 206 and 216 is executed as often as macro definition inputs are entered by the operator, or until a maximum number of macro elements is entered (test for detecting a maximum number of elements, not shown).

Figure 3:
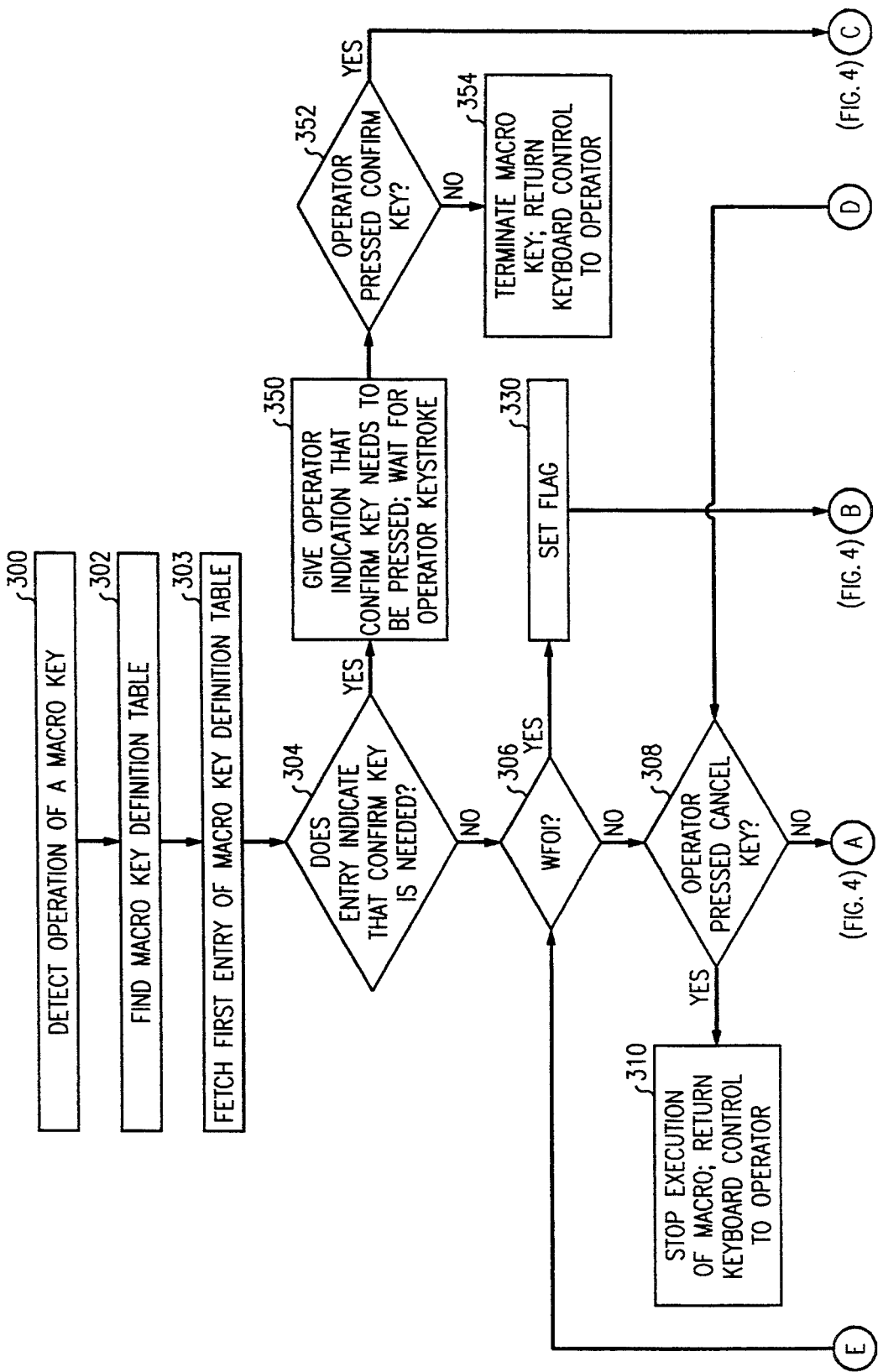
FIGS. 3 and 4 are flow diagrams of a program for executing a macro key sequence.
Figure 4:
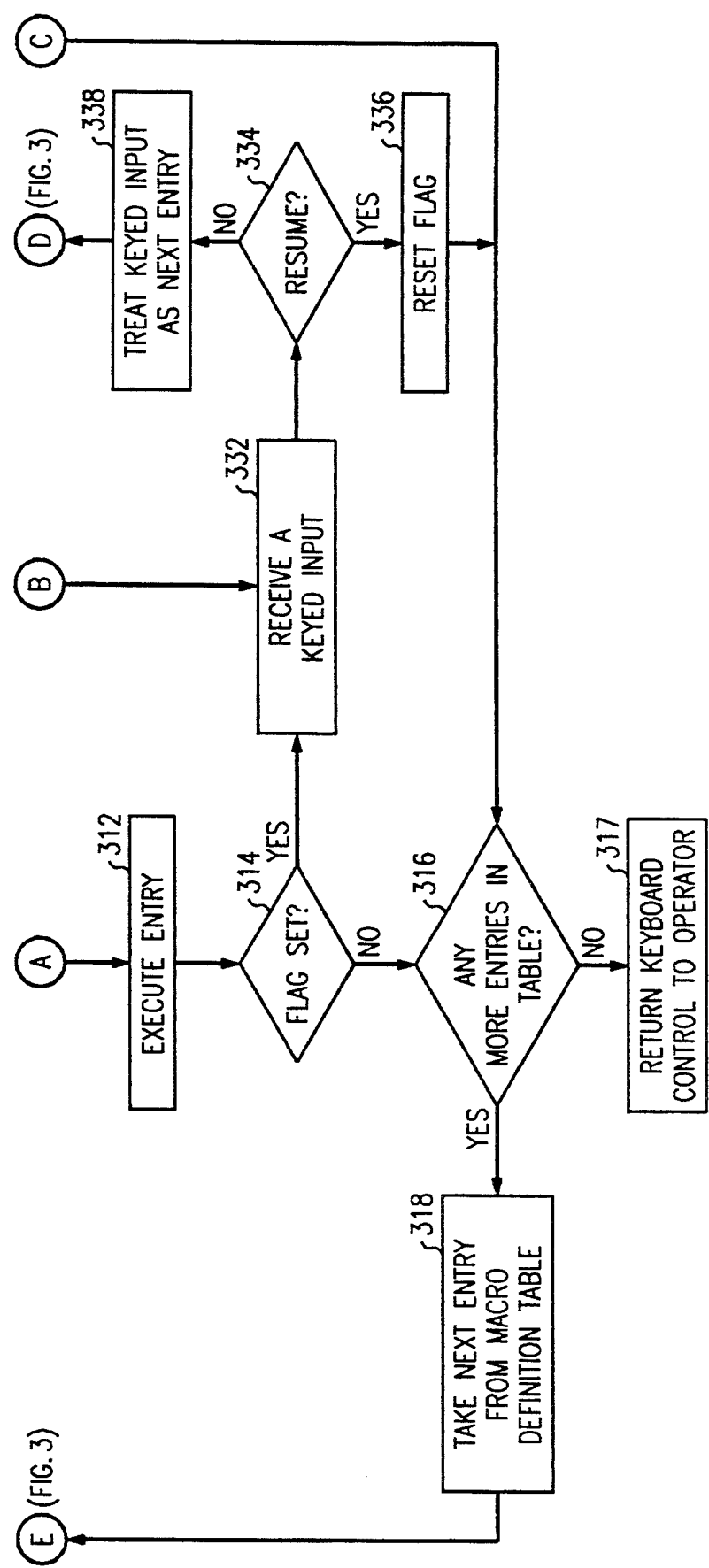

FIGS. 3 and 4 are flowcharts of the operation of the macrointerpreter. The operation of the macro key is detected (action block 300). The processor then finds the macro key definition corresponding to that macro key (action block 302) and fetches the first entry from the macro definition table (action block 303). Next, test 304 is used to determine whether confirmation is needed. If the entry specifies that confirmation is needed, then the execution of the macro key sequence is not started until the confirm key is pressed. If confirmation is not needed, then test 306 checks to see if the entry is a control code specifying "wait for operator input" (WFOI). If not, then test 308 checks whether the operator has pressed the cancel key. If so, further execution of the macro sequence is stopped, and keyboard control is returned to the operator (action block 310). If the cancel key has not been pressed, then the entry from the macro definition table, or, as discussed hereinafter, the entry from the operator is executed (action block 312, FIG. 4). Next, test 314 checks if a flag (associated with operation of the WFOI key and described further with respect to action block 330) has been set. If so, the program transfers to action block 332 described hereinafter. If the flag has not been set, then test 316 is executed to determine if there any more entries in the macro definition table. If not, keyboard control is returned to the operator (action block 317). If there are more entries in the macro definition table, then the next entry from the macro key definition table is fetched (action block 318) and the loop beginning with test 306 (FIG. 3) is entered.

If the result of test 306 (previously described, FIG. 3) is that the macro key definition element being analyzed is a WFOI entry, then a flag is set (action block 330) to cause the system to process further inputs from the keyboard until the operator presses the resume key. When the next keyed input is received (action block 332, FIG. 4), test 334 determines whether the resume key was operated. If so, then the flag is reset (action block 336) and test 316 is entered to see if there are any more items in the macro definition table. If test 334 determined that the resume key was not operated, then the keyed input is treated as the next element to be executed (action block 338) and program control is transferred to test 308, FIG. 3. In this way, operator keyed input can be inserted in the middle of prespecified sequences of key operations.

If the result of test 304, (FIG. 3) is that operation of the confirm key is needed in this macro key sequence expansion, then an indication is given to the operator that a confirm key needs to be pressed. This indication will be displayed on the monitor of the operator position. Action block 350 indicates that the operator is given this indication and that the system waits for an operator keystroke. Test 352 determines whether the operator has pressed the confirm key. If so, program control is transferred to test 316, FIG. 4, previously described. If the operator does not press the confirm key, then execution of the macro key sequence is terminated and regular keyboard control is returned to the operator (action block 354, FIG. 3).

While the exemplary embodiment is for a telephone operator position, the same arrangements can be used wherever a user enters information into a system. The invention is particularly effective for repetitive data entry operations calling for a portion of a sequence to be entered by a human operator for a specific instance while the rest of the sequence is preprogrammed. The operator-entered portion can be in the middle of the sequence; a number of operator-entered portions can be interspersed within one sequence.

Further, while this description has used a keyboard, any data entry device can be similarly used. An example is a card reader which reads control codes and/or data encoded on magnetic or paper media. A system can be devised wherein a pre-programmed WFOI control code, read using the card reader, directs the system to wait for input from a human user before reading any more pre-programmed entries from the card reader.

It is to be understood that the above description is only of one preferred embodiment of the invention. Numerous other arrangements may be devised by one skilled in the art without departing from the scope of the invention. The invention is thus limited only as defined in the accompanying claims.

I claim:

1. A method of generating and transmitting a series of commands to a telephone operator assistance system from an operator position, comprising the ordered steps of:
   responsive to entry of data into said operator position for assignment to a specific macro key, said data for defining a series of commands, each of said commands comprising at least one of a machine directive or alphanumeric data, and the defined series comprising a command for displaying a prompt to request entry of an additional command, storing in said operator position a definition of said series of commands in a macro definition table, said series of commands comprising a first subset, said prompt, and a second subset, the format and function of said additional command not being defined in said macro definition table;
   subsequently, an operator receiving a request for service at said operator position;
   responsive to receipt of said request for service, said operator operating said specific macro key;
   responsive to detecting operation of said specific macro key, said operator position transmitting a first subset of said series of commands to said operator assistance system;
   displaying said prompt at said operator position;
   responsive to seeing said prompt, said operator entering said additional command into said operator position;
   said operator position transmitting said additional command to said operator assistance system; and
   said operator position subsequently transmitting said second subset of said series of commands to said operator assistance system;
   wherein said additional command comprises at least one of a machine directive or alphanumeric data; and
   wherein machine directives comprise operator commands for requesting performance of telephone switching actions by said operator assistance system.

2. The method of claim 1 further comprising the step of:
   responsive to said operator operating said specific macro key, producing a humanly detectable indication at said operator position.

3. The method of claim 2 wherein said operator position comprises a visual indicator and said indication is displayed on said indicator.

4. The method of claim 3 wherein said indication comprises a prompt text.

5. The method of claim 4 wherein said text specifies the type of command to be entered.

6. The method of claim 1 wherein said series of commands comprises a prompt command for specifying a request to operate a confirm key.

7. The method of claim 1 further comprising the step of:
   in response to operation of a cancel key in said operator position, halting further transmission of commands.

8. The method of claim 1 wherein said step of transmitting said additional command comprises transmitting a delimiter machine directive as a last segment of said additional command; and
   wherein the step of transmitting said second subset is performed in response to detecting transmission of said delimiter.

* * * * *